United States Patent [19]

Bogardus

[11] 4,424,803
[45] Jan. 10, 1984

[54] SOLAR COLLECTOR

[76] Inventor: Fred D. Bogardus, 2149 Post Rd., Southport, Conn. 06490

[21] Appl. No.: 376,286

[22] Filed: May 10, 1982

[51] Int. Cl.³ .............................................. F24J 3/02
[52] U.S. Cl. .................................. 126/429; 126/445; 126/449
[58] Field of Search ............... 126/417, 429, 441, 444, 126/445, 449, 450, 901; 165/168, 170, 184

[56] References Cited

U.S. PATENT DOCUMENTS

| 842,658 | 1/1907 | Haskell | 126/449 |
|---|---|---|---|
| 4,016,861 | 4/1977 | Taylor | 126/449 |
| 4,196,717 | 4/1980 | Giucanino | 126/450 |
| 4,201,195 | 5/1980 | Sakhuja | 126/449 |
| 4,203,428 | 5/1980 | Fodor | 126/450 |
| 4,210,130 | 7/1980 | Boodley et al. | 126/449 |
| 4,219,012 | 8/1980 | Bergen | 126/449 |
| 4,262,659 | 4/1981 | Brzezinski | 126/445 |
| 4,266,531 | 5/1981 | Behrendt | 126/449 |
| 4,271,823 | 6/1981 | Erb | 126/445 |
| 4,289,117 | 9/1981 | Butcher | 126/450 |

Primary Examiner—Daniel J. O'Connor
Attorney, Agent, or Firm—Arthur T. Fattibene

[57] ABSTRACT

A solar collector which includes a housing having its exposed side covered with a doubled walled reinforced light pervious sheet defining with the housing an heating plenum in which a plurality of spaced apart vanes are transversely supported between the opposed ends of the housing. Each of the vanes are twisted between their respective ends so as to optimize the surface area thereof exposed to the direct rays of the sun for maximum heat absorption as the sun traverses an arc relative thereto. The housing is also provided with an inlet and outlet for permitting the flow of a medium to be heating to pass therethrough in heat exchange relationship to the vanes and interior surfaces of the housing.

1 Claim, 6 Drawing Figures

U.S. Patent Jan. 10, 1984 4,424,803
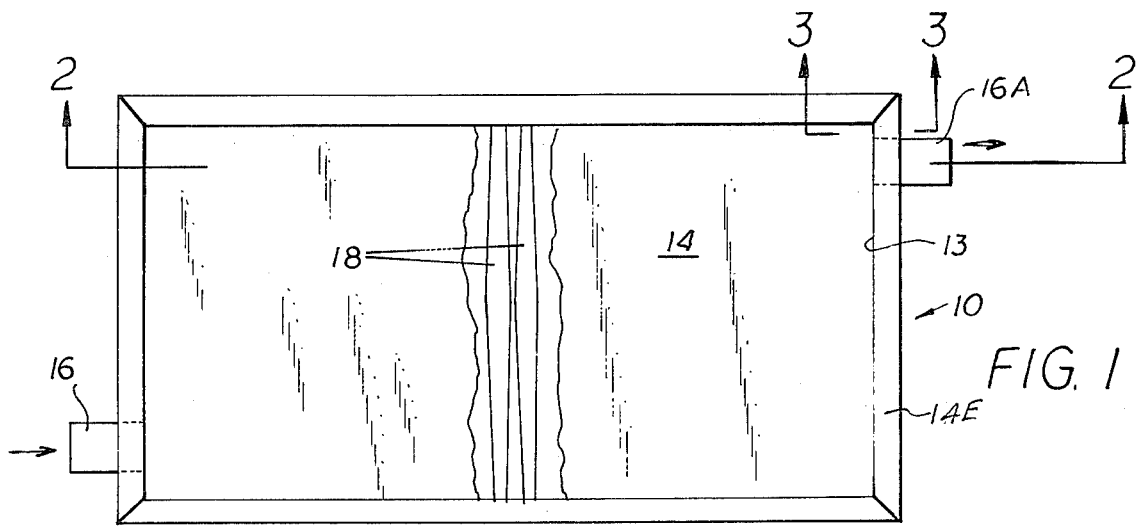
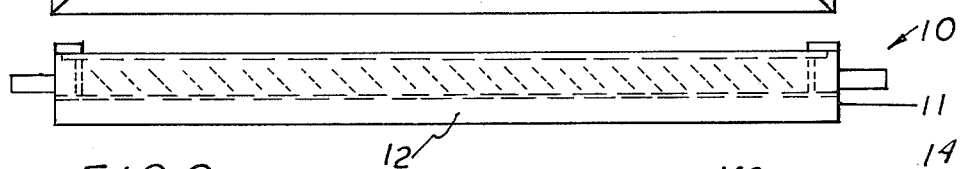
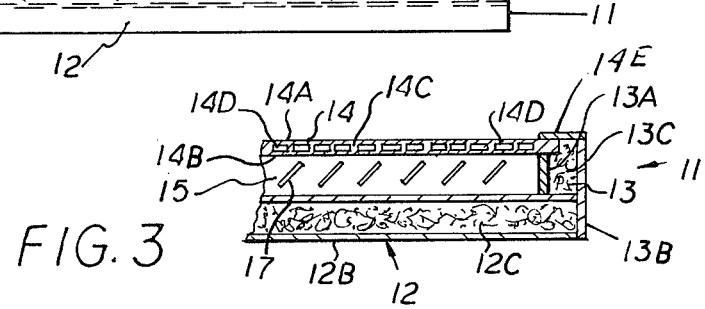
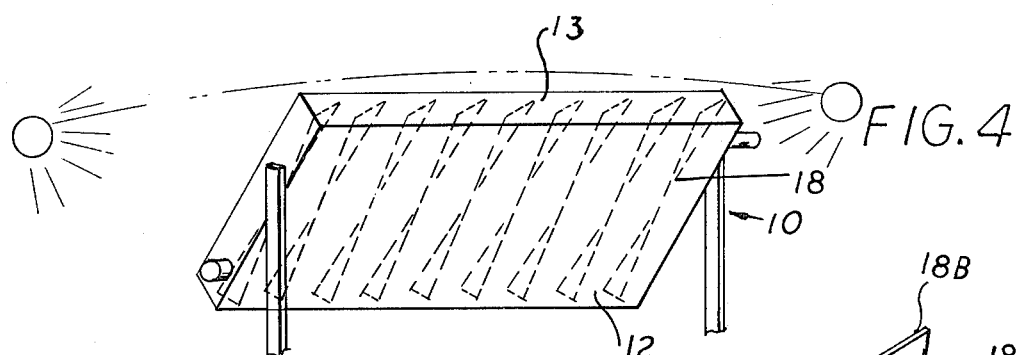
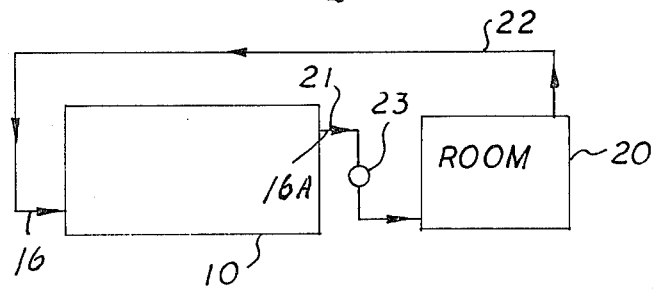
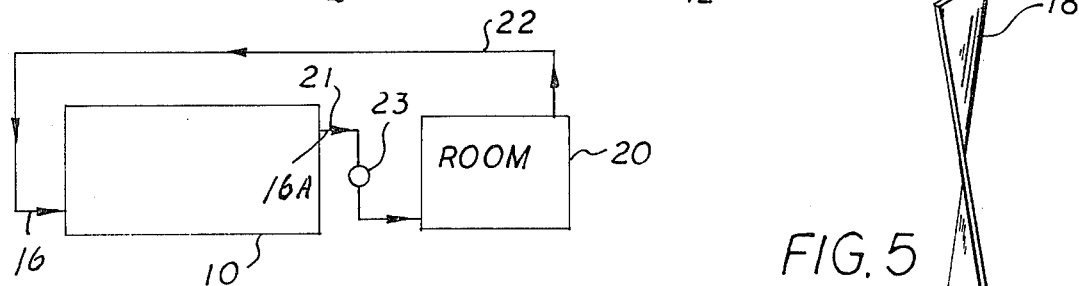

SOLAR COLLECTOR

STATE OF THE KNOWN ART

Heretofore, various efforts have been made and are continuing to be made to increase the efficiency and/or to simplify the construction of solar collectors or solar heating panels. Such efforts are readily apparent as disclosed in U.S. Pat. Nos. 4,099,513; 4,128,095; 4,127,098; 4,203,428; 4,265,221; 4,296,741 and 4,297,990. It has been observed that the solar panels or collectors of the type to which this invention relates are static or fixed relative to the sun at an optimum fixed angle depending upon the particular latitude and/or longitude of the collector relative to the sun so that the sun's rays may strike the solar panel as directly as possible to achieve maximum heat absorption.

However, with the known solar panels and collectors, the maximum attainable heat absorption was not feasible for the reason that as the sun moved relative to the known statically fixed solar panels, the angle at which the sun rays were directed against the heat absorption surfaces of such panels varied greatly. As a result, the heat absorption surfaces of the known fixed solar panel construction were not constructed so as to absorb the maximum amount of direct solar energy. Consequently, the less solar energy that could be absorbed by surfaces of the known solar panels the less heat was available or present to be transferred to a medium to be heated thereby. For the reason the efficiency of the known solar panels was less than that which is possible.

OBJECTS

An object of this invention is to provide a solar panel capable of achieving greater efficiency by enabling the heat absorption surfaces thereof to absorb more of the available solar energy.

Another object is to provide a solar collector or panel with specifically formed heat absorption surfaces arranged so as to optimize the exposed surface area thereto to the direct rays of the sun as the sun traverses its path relative to the collector.

Another object is to provide for a more effective heat absorbing solar panel which is relatively simple in construction, inexpensive to manufacture and which is positive in operation.

Another object of this invention is to maximize the total surface area of a solar panel upon which the rays of the sun directly impinge.

BRIEF DESCRIPTION OF THE INVENTION

The foregoing objects and other features and advantages are attained by a solar collector or panel which comprises a frame or housing having an exposed side covered by a reinforced double wall light pervious cover so as to define a plenum in which the medium to be heated by solar energy flows. The external walls of the housing are highly insulated to prevent heat loss and disposed within the housing and extending transversely thereof are a plurality of heat absorbing vanes. The respective vanes are formed of thin, good heating conducting material for absorbing the heat of solar radiation. The respective vanes are formed with a twist between the ends thereof so that the rays of the sun impinges directly on a major portion of the surface area of the vanes throughout the relative movement of the sun relative to the solar panel. An inlet and outlet are provided on opposed ends of the plenum defined by the housing, and a blower or fan is disposed in the duct work to provide a forced circulation of the medium to be heated through the heating plenum. The arrangement is such that the medium to be heating flows transversely of the respective vanes in heat transfer relationship therewith.

FEATURES

A feature of this invention resides in providing a plurality of heat absorbing vanes extending transversely of a plenum chamber wherein the vanes are twisted so a portion of the vane is always directed normal to the sun's rays for optimum exposure to the direct solar rays.

Another feature resides in the provision of a static or fixed solar panel having a plurality of heat absorbing surfaces that are angularly disposed relative to the flow of a medium to be heated so as to enhance the transfer of heat therebetween.

Another feature resides in a solar panel having a reinforced light impervious panel through which the solar rays are directed onto a series of twisted vanes extending transversely of the solar panel.

Other features and advantages will be readily apparent when considered in view of the drawings and specifications in which:

FIG. 1 is a plan view of a solar panel embodying the invention;

FIG. 2 is a sectional view taken along line 2—2 of FIG. 1.

FIG. 3 is a fragmentary enlarged detailed sectional view taken along line 3—3 on FIG. 1.

FIG. 4 is a schematic prospective view illustrating the solar panel of this invention placed relative to the sun.

FIG. 5 is a perspective detailed view of a heating vane utilized in the solar panel of this invention.

FIG. 6 is a diagrammatic showing of the solar panel disposed in a closed cycle heating system.

DETAILED DESCRIPTION

Referring to the drawings, there is shown in FIGS. 1, 2 and 4 a solar panel or heater 10 which embodies the invention. The panel 10 comprises a housing 11 which is defined by a bottom wall 12, the outer periphery of which has connected thereto a circumscribing end wall 13. In the illustrated embodiment, both the bottom wall 12 and the circumscribing end walls 13 are termally insulted so as to prohibit heat loss therethrough.

As best seen in FIG. 3, the bottom wall 12 is defined by a pair of spaced apart wall portions 12A and 12B between which is sandwiched a layer of thermal insulating material 12C, such as fiberglass wool or other suitable thermal insulating material. The circumscribing end walls 13 are also formed of a doubled wall structure including an inner end wall portion 13A and an outer end wall portion 13B between which is sandwiched insulating material 13C. The housing 11, thus defined, comprises a thermally insulated base portion of the solar panel. It will be understood that the solar panel may be made in any suitable size. In the illustrated embodiment, standard 4'×8' panels or sheets of material, e.g. plywood, sheet metal or the like, may be used to form the bottom wall.

The open or exposed side of the housing 11 is provided with a cover 14 of light pervious material such as transparent or light pervious, glass or plastic sheet material. With the cover 14 seated on the inner end wall portion 13A, a closed plenum or chamber 15 is defined.

As best seen in FIG. 3, the cover 14 is defined by a pair of spaced apart sheets 14A, 14B of light pervious material having a plurality of spaced apart transversely extending webs 14C. With the cover construction defined, a plurality of channels or spaces 14D extend transversely of the cover sheet 14 whereby the traversely extending webs function to reinforce the cover 14 and the spaces defined between the webs provide for thermal insulation to prevent heat loss therethrough.

The cover sheet 14 rests on the upper edge of the inner end wall portion and is secured to the housing 11 by a frame 14E, which is suitably secured by fasteners.

The plenum or chamber 15 is also provided with an inlet 16 and an outlet 17 through which the medium, such as air, to be heated, can readily flow through the panel 10.

In accordance with this invention, a plurality of vanes 18 extend transversely of the plenum 15. Each vane is formed of a good thermal conducting material such as copper, tin, aluminium or the like, which is relatively thin. For an 4'×8' size panel, the vanes may be formed of sheet material 1/32" thick and approximately 3 inches in width. As best shown in FIG. 5, each vane 18 is twisted. In the illustrated embodiment, the end 18A and 18B are disposed approximately 90° out of phase, i.e. are angularly offset by 90°. The respective ends 18A, 18B of vanes 18 are suitably secured to the opposed portions of the end walls 13, so as to extend transversely of the plenum 15 through which the heating medium flows. In accordance with this invention, when the solar panel 10 is erected as shown in FIG. 4, the cover sheet 14 of the panel is directed toward the sun. It will be understood that the solar panel is angularly disposed relative to the horizontal depending on the particular lattitude so as to receive the optimum direct solar rays. By effecting the twist in each of the solar vanes 18, as described, it will be noted that a major portion of the vanes will receive the direct rays of the sun, thus insuring that each vane will receive direct solar rays at all times as the sun travels its arc relative to the fixed solar panel 10. Thus, the panel 10 will be able to absorb the maximum amount of solar energy whereby the amount of absorbing surfaces exposed to the direct rays of solar energy can be maintained substantially uniform through the solar day.

To enhance heat absorption of the solar energy, it will be understood that both sides of the vanes 18 and the entire internal surface of the housing 11 are painted or colored black.

The twist imparted to each vane also imparts a generally turbulent flow to the medium or air being heated as it flows through the plenum or chamber 15 to further enhance the transfer of heat from the solar heated vane and housing to the passing medium or air.

FIG. 6 illustrates the solar panel 10 as described in a heating system for heating a space, e.g. a room or house 20. The panel 10 is disposed so as to receive the solar rays. The outlet 16A is connected by insulated duct work 21 to a hot air inlet leading into the room 20 to be heated. The room cold air outlet is connected by duct work 22 to the air inlet 16 of the solar panel 20. A fan or blower 23 is disposed in the duct work to enhance the circulation of the heating medium, i.e. air between the room 20 and the solar panel 10. In the illustrated system of FIG. 6, a suction type fan is shown to withdraw the heated air from the solar panel and to force the heated air into the room 20. It will be understood that the fan or blower 23 may be thermostatically operated so that the fan will start operating only when the air in the plenum 15 has reached a predetermined temperature.

The solar panel 10 described depending upon the region or climate may be used to supplement or back-up the conventional heating system, or may function as the primary heating system.

While the illustrated embodiment is used to heat air, any other medium may be heated. The principle described may also be used to heat water or other heating medium.

While the invention has been described with respect to a particular embodiment thereof, it will be understood and appreciated that variations and modifications may be made without departing from the spirit or scope of the invention.

What is claimed is:

1. A solar heating for heating air comprising
    a solar collector having a bottom wall and circumscribing end walls connected to said bottom wall to define a housing having an opened exposed side adapted to be directed toward the sun,
    means for thermally insulating the walls of said housing about the exterior surface thereof,
    a cover means connected to said housing to define a closure for said exposed side, said cover means being pervious to the sun's rays and spaced from the bottom wall of said housing to define therebetween an air heating plenum, said cover means including a pair of spaced apart light pervious sheet material, and a plurality of traversely spaced apart webs interconnected in space relationship between said pair of light pervious sheets, said webs being formed of the same material as said light pervious sheets,
    a plurality of spaced apart vanes extending transversely between opposed end walls of said housing in said air heating plenum,
    said vanes being formed of thin, flat thermal conducting material whereby each vane is twisted between its ends whereby the respective ends of said vanes are off-set approximately 90° relative to each other so as to optimize the exposed surface area of said vanes to the direct rays of the sun as the sun transverses an arc relative thereto,
    means for securing the ends of the respective vanes to the adjacent end wall of said housing,
    and said vanes having their respective longitudinal edges spaced from said bottom wall and lowermost light pervious sheet of said cover means,
    and a blackened heat absorbing coating disposed on both sides of said vanes and the interior surfaces of said housing,
    means defining an inlet into said plenum, and means defining an outlet for said plenum,
    and means for imparting a flow of air through said plenum from said inlet to said outlet whereby the air flowing therethrough passes in direct heat transfer relationship to said vanes extending thereacross.

* * * * *